United States Patent
Thelen et al.

(10) Patent No.: US 10,596,968 B2
(45) Date of Patent: Mar. 24, 2020

(54) PRISM TOGGLE SPRING

(71) Applicant: Gentex Corporation, Zeeland, MI (US)

(72) Inventors: David L. Thelen, Wayland, MI (US); Ulrich A. Kuester, Spring Lake, MI (US)

(73) Assignee: GENTEX CORPORATION, Zeeland, MI (US)

( * ) Notice: Subject to any disclaimer, the term of this patent is extended or adjusted under 35 U.S.C. 154(b) by 170 days.

(21) Appl. No.: 15/709,921

(22) Filed: Sep. 20, 2017

(65) Prior Publication Data

US 2019/0084480 A1 Mar. 21, 2019

(51) Int. Cl.
| | | |
|---|---|---|
| *B60R 1/02* | (2006.01) | |
| *B60R 1/04* | (2006.01) | |
| *B60R 1/08* | (2006.01) | |

(52) U.S. Cl.
CPC ............ *B60R 1/025* (2013.01); *B60R 1/04* (2013.01); *B60R 1/086* (2013.01)

(58) Field of Classification Search
CPC .......... B60R 1/025; B60R 1/086; B60R 1/04; B60R 1/12
USPC ................................................ 359/873, 604
See application file for complete search history.

(56) References Cited

U.S. PATENT DOCUMENTS

| | | |
|---|---|---|
| 3,421,728 A | 1/1969 | Gordon |
| 3,467,465 A | 9/1969 | Van Noord |
| 3,522,987 A * | 8/1970 | Pflaum ................... B60R 1/086 359/606 |
| 4,895,337 A | 1/1990 | Oksam et al. |
| 5,956,181 A | 9/1999 | Lin |
| 6,318,870 B1 | 11/2001 | Spooner et al. |
| 6,321,159 B1 | 11/2001 | Nohtomi et al. |
| 6,349,450 B1 | 2/2002 | Koops et al. |
| 6,520,667 B1 | 2/2003 | Mousseau |
| 6,549,691 B1 | 4/2003 | Street et al. |
| 6,567,574 B1 | 5/2003 | Ma et al. |
| 6,648,477 B2 | 11/2003 | Hutzel et al. |
| 6,711,314 B1 | 3/2004 | Mori et al. |
| 6,922,500 B2 | 7/2005 | Huang et al. |
| 6,934,438 B2 | 8/2005 | Hoke |
| 6,947,629 B2 | 9/2005 | Chu et al. |
| 7,255,451 B2 | 8/2007 | McCabe et al. |
| 7,329,013 B2 | 2/2008 | Blank et al. |
| 7,510,287 B2 | 3/2009 | Hook |

(Continued)

*Primary Examiner* — Jade R Chwasz
*Assistant Examiner* — Rahman Abdur
(74) *Attorney, Agent, or Firm* — Price Heneveld LLP; Bradley D. Johnson

(57) ABSTRACT

A rearview mirror for a vehicle includes an actuation mechanism coupled within a housing. The actuation mechanism includes a mounting plate rotatably coupled within the cavity of the housing at a first end thereof. A spring plate is coupled with the mounting plate and has a first resiliently deformable arm portion extending away from the mounting plate to define a first bend disposed on a first side of the spring plate and a second resiliently deformable arm portion extending away from the mounting plate to define a second bend disposed on a second side of the spring plate. The actuation mechanism further includes a toggle barrel rotatably coupled within the interior cavity of the housing. The first and second arm portions of the spring plate are operably coupled with the toggle barrel along a coupling axis.

20 Claims, 5 Drawing Sheets

(56) References Cited

U.S. PATENT DOCUMENTS

| | | | |
|---|---|---|---|
| 7,722,199 B2 * | 5/2010 | DeWard | B60R 1/04 248/481 |
| 7,888,629 B2 | 2/2011 | Heslin et al. | |
| 7,916,009 B2 | 3/2011 | Schofield et al. | |
| 8,351,454 B2 | 1/2013 | Jain et al. | |
| 8,817,359 B2 | 8/2014 | Chau | |
| 9,041,806 B2 | 5/2015 | Baur et al. | |
| 9,338,528 B2 | 5/2016 | Borkenhagen et al. | |
| 9,475,431 B2 | 10/2016 | Brummel et al. | |
| 9,529,157 B2 | 12/2016 | Zhang et al. | |
| 2002/0047378 A1 | 4/2002 | Bingle et al. | |
| 2002/0159171 A1 | 10/2002 | Schnell et al. | |
| 2003/0011908 A1 | 1/2003 | Marusawa et al. | |
| 2003/0137757 A1 * | 7/2003 | Wachi | B60R 1/086 359/880 |
| 2004/0148102 A1 | 7/2004 | McCarthy et al. | |
| 2004/0263988 A1 | 12/2004 | Lin | |
| 2005/0068647 A1 | 3/2005 | Brandt | |
| 2005/0213978 A1 | 9/2005 | Yamashita et al. | |
| 2005/0248847 A1 | 11/2005 | Weimer et al. | |
| 2006/0050018 A1 | 3/2006 | Hutzel | |
| 2007/0279756 A1 | 12/2007 | Rosario et al. | |
| 2008/0049344 A1 | 2/2008 | DeWard et al. | |
| 2008/0055757 A1 | 3/2008 | Uken et al. | |
| 2008/0077882 A1 | 3/2008 | Kramer et al. | |
| 2008/0225538 A1 | 9/2008 | Lynam et al. | |
| 2009/0040306 A1 | 2/2009 | Foote et al. | |
| 2010/0046104 A1 | 2/2010 | Rimac | |
| 2011/0176323 A1 | 7/2011 | Skiver et al. | |
| 2011/0188122 A1 | 8/2011 | Habibi et al. | |
| 2013/0107347 A1 | 5/2013 | Chau | |
| 2013/0279014 A1 | 10/2013 | Fish, Jr. et al. | |
| 2014/0347488 A1 | 11/2014 | Tazaki et al. | |

\* cited by examiner

PRISM TOGGLE SPRING

TECHNOLOGICAL FIELD

The present disclosure relates generally to a rearview mirror actuator and, more particularly, relates to an actuation mechanism including opposing spring arms to provide stable positions for the mirror and to reduce inadvertent movement from either stable position.

BACKGROUND

Various types of rearview mirrors can be used in connection with vehicle interiors. In general, rearview mirrors are mounted adjacent the windshield either by attachment with the windshield or to an internal component adjacent the headliner. Such attachment is, for example, achieved by a mounting that couples with an actuation mechanism internal to the mirror housing. A substrate is affixed with the mirror housing and is generally configured to present an image of the view to the rear of the vehicle and, accordingly, may be adjustable by movement of the housing about the mounting structure.

In the case of a standard rearview mirror, the substrate is often a prism-type mirror that provides for a viewing angle at which the substrate reflects the rearward view of mirror with a reduced luminosity to provide a dimming effect useful when driving at night, for example. In such an embodiment, the dimmed viewing angle for the substrate may be at a predetermined angle upward (i.e. toward the headliner) relative to the "normal" viewing angle. To achieve such positioning, rearview mirrors include various types of actuation mechanisms to provide for user control in repositioning of the substrate. Such movement can be achieved by manipulation of a lever, which can cause the actuation mechanism to move between stable positions, thereby causing movement of the substrate through a predetermined angle relative to the mounting structure that appropriately positions the substrate in a corresponding viewing position. Further, the actuation mechanism can couple with the mounting to allow general adjustment of the housing and substrate with respect to the driver for viewing of the image viewable on the substrate. In this manner, the actuation mechanism can allow the substrate to toggle between the stable viewing positions without changing the positions themselves such that substrate provides generally the same view in the night mode as has been selected for the standard mode.

Some existing actuation mechanisms achieve movement between the above-referenced stable positions by way of a resiliently deformable spring plate. In general, such spring plates include a bent section to provide an area of flexation that accommodates movement of components within the actuation mechanism. The spring force achieved by such flexation can urge the actuation mechanism to one of the stable positions. These types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. However, in the opposite position, the mechanism may be susceptible, depending on the particular spring force and other internal forces, to inadvertent movement out of the stable position, which may be caused by a user adjusting the position of the mirror by grasping and moving the housing. In the case of a standard prism mirror, such inadvertent actuation may be inconvenient. Accordingly, further advances may be desired.

SUMMARY

According to an aspect of the disclosure, an actuation mechanism for a rearview mirror includes a mounting plate defining a first end and a second end with opposite first and second faces extending between the first and second ends. A spring plate is coupled with the first face of the mounting plate with a first side of the spring plate disposed toward the first face of the mounting plate and a second side disposed away from the first face. The spring plate has a first resiliently deformable arm portion extending away from the second end of the mounting plate to define a first bend disposed on the first side of the spring plate and a second resiliently deformable arm portion extending away from the second end of the mounting plate to define a second bend disposed on the second side of the spring plate. The actuation mechanism further includes a toggle barrel, the first and second arm portions of the spring plate being operably coupled with the toggle barrel along a coupling axis.

According to another aspect of the disclosure, a rearview mirror for a vehicle includes a housing defining an interior cavity and an open side, a substrate coupled within the open side of the housing and having a reflective surface thereon, and an actuation mechanism coupled within the housing. The actuation mechanism includes a mounting plate having a first end rotatably coupled within the cavity of the housing and a second end spaced from the first end. The mounting plate defines first and second opposed faces extending between the first and second ends. A spring plate is coupled with the mounting plate with a first side thereof disposed toward the first face of the mounting plate and a second side disposed away from the first face. The spring plate has a first resiliently deformable arm portion extending away from the mounting plate to define a first bend disposed on the first side of the spring plate and a second resiliently deformable arm portion extending away from the mounting plate to define a second bend disposed on the second side of the spring plate. The actuation mechanism also includes a toggle barrel rotatably coupled within the interior cavity of the housing, the first and second arm portions of the spring plate being operably coupled with the toggle barrel along a coupling axis.

According to another aspect of the disclosure, a vehicle includes a windshield, a headliner adjacent an upper edge of the windshield, and a rearview mirror. The rearview mirror includes a housing defining an interior cavity and an open side, a substrate coupled within the open side of the housing and having a reflective surface thereon, and an actuation mechanism coupled within the housing. The actuation mechanism has a mounting arm coupled with one of the windshield or the headliner and a mounting plate coupled with the mounting arm and having a first end rotatably coupled within the cavity of the housing and a second end spaced from the first end, the mounting plate defining a first and second opposed faces extending between the first and second ends. The actuation mechanism also has a spring plate coupled with the mounting plate such that a first side of the spring plate is disposed toward the first face of the mounting plate and a second side is disposed away from the first face. The spring plate has a first resiliently deformable arm portion extending away from the mounting plate to define a first bend disposed on the first side of the spring plate and a second resiliently deformable arm portion extending away from the mounting plate to define a second bend disposed on the second side of the spring plate. A toggle barrel is rotatably coupled within the interior cavity of the housing, the first and second arm portions of the spring plate being operably coupled with the toggle barrel along a coupling axis.

These and other features, advantages, and objects of the present device will be further understood and appreciated by those skilled in the art upon studying the following specification, claims, and appended drawings.

DETAILED DESCRIPTION OF EMBODIMENTS

Figure 1:
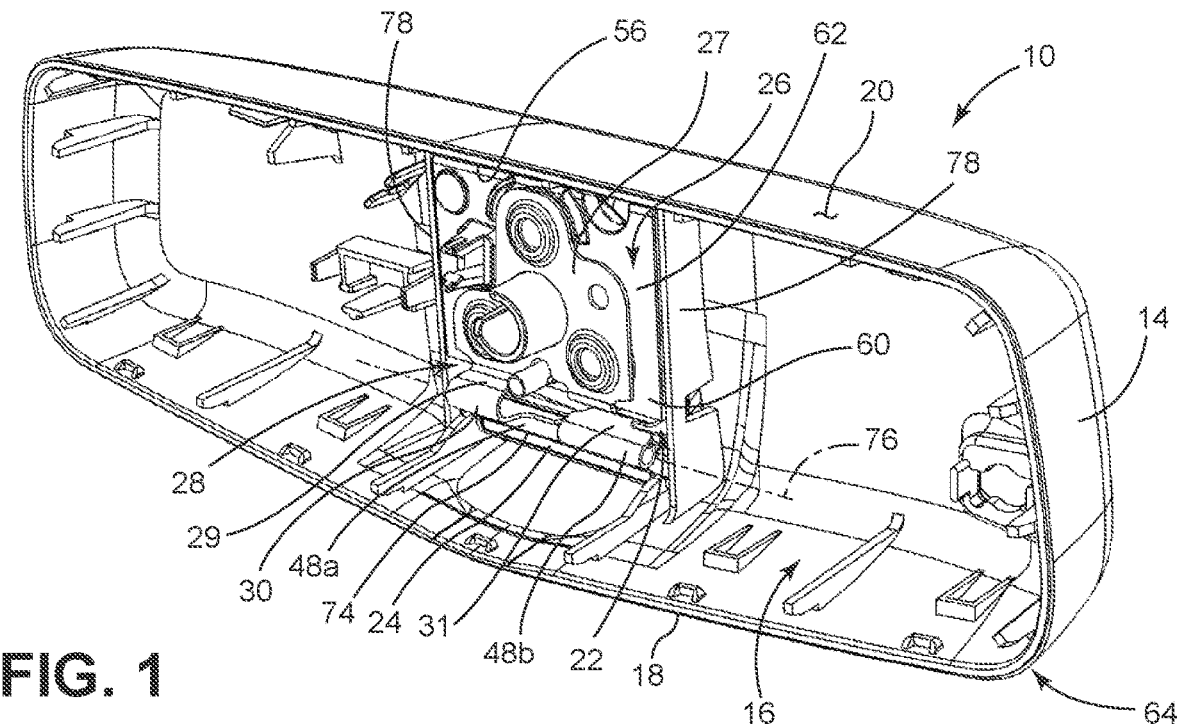
FIG. 1 is a front perspective view of a portion of a rearview mirror assembly according to an aspect of the disclosure in a first position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
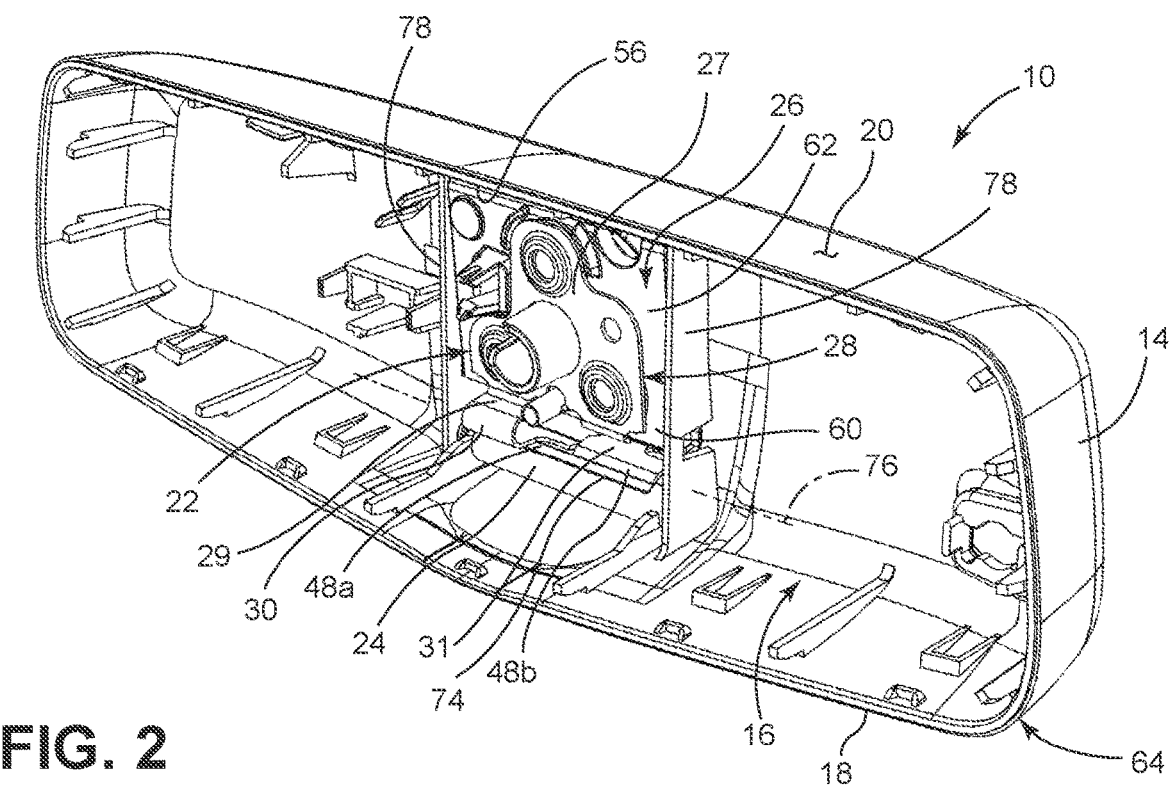
FIG. 2 is a front perspective view of the portion of the rearview mirror assembly of FIG. 1 in a second position.
Figure 3:
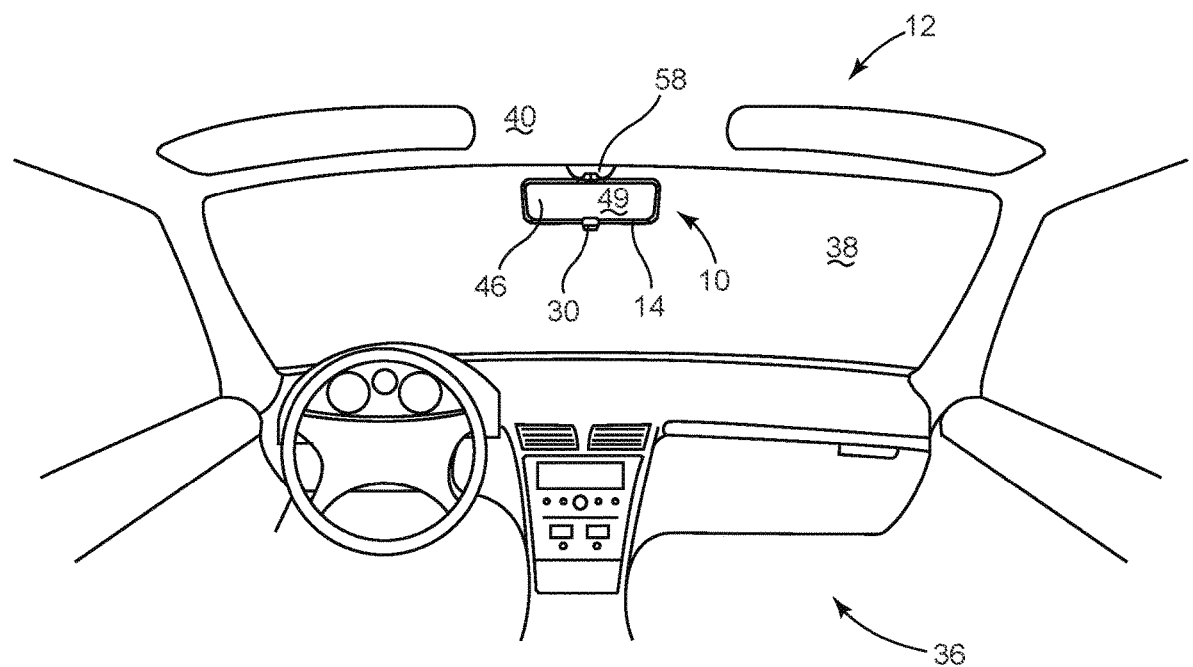
FIG. 3 shows an interior of a vehicle including the rearview mirror assembly of FIG. 1.

As shown in FIGS. 1-8, reference numeral 10 generally designates a rearview mirror 10 useable within a vehicle 12 (FIG. 3). The rearview mirror 10 includes a housing 14 defining an interior cavity 16 and an open side 18, a substrate 46 coupled within the open side 18 of the housing 14 and having a reflective surface 49 thereon, and an actuation mechanism 22 coupled within the housing 14. The actuation mechanism 22 includes a mounting plate 26 having a first end 56 rotatably coupled within the cavity 16 of the housing 14 and a second end 60 spaced from the first end 56. The mounting plate 26 defines first and second opposed faces 62,63 extending between the first and second ends 56 and 60. A spring plate 28 is coupled with the mounting plate 26 with a first side 64 thereof disposed toward the first face 62 of the mounting plate 26 and a second side 65 disposed away from the first face 62. The spring plate 28 has a first resiliently deformable arm portion 29 extending away from the mounting plate 26 to define a first bend 30 disposed on the first side 64 of the spring plate 28 and a second resiliently deformable arm 31 portion extending away from the mounting plate 26 to define a second bend 32 disposed on the second side 65 of the spring plate 28. The actuation mechanism 22 also includes a toggle barrel 24 rotatably coupled within the interior cavity 16 of the housing 14, the first and second arm portions 29,31 of the spring plate 28 being operably coupled with the toggle barrel 24 along a coupling axis 54.

As shown in FIG. 3, rearview mirror 10 can be used in connection with a vehicle interior 36. In particular, rearview mirror 10 can be mounted adjacent a windshield 38 of vehicle 12 either by attachment with the windshield 38 itself or to an internal component adjacent headliner 40 (which may include a portion of the vehicle frame, a vehicle panel, or other support structure, for example). Such attachment is achieved by a mounting arm 42 (FIG. 6) that is coupled with vehicle 12, as described, and couples with actuation mechanism 22 (FIG. 2), as explained further below, by extending through an aperture 44 (FIG. 8) in housing 14. Opposite aperture 44, a substrate 46 is positioned over an open side 18 of housing 14. Substrate 46 is generally configured to present an image to a driver of vehicle 12 of the view to the rear of vehicle 12 and, accordingly may be adjustable by movement of housing 14 about mounting arm 42. In one embodiment, substrate 46 can include a video display along a portion or an entirety thereof such that rearview mirror 10 is what may be referred to as a full-display mirror. Substrate 46 including such a display is referred to herein as "display substrate 46" and may be capable of displaying a mirror-image of the view to the rear of vehicle 12 (that may be captured by an appropriately-positioned video camera or the like) when the display is in an active state. Such an image may generally replicate that which would be available from a typical reflective mirror and can be supplemented with other information presented on display substrate 46. In combination with such a display substrate 46, a reflective surface 49 may be applied so as to overlie the display as a coating or separate element having properties to both provide a reflected image as well as to permit a video image of display substrate 46 to be visible therethrough.

The presence of reflective surface 49 permits substrate 46 to be used as a standard rearview mirror (i.e. without the need to view the displayed image) when the display is inactive, which may occur when the related vehicle 12 is not running or when power to the display substrate 46 is interrupted, for example. When in the active state, however, the presence of the reflective surface 49 over display substrate 46 can cause the image reflected by reflective surface 49 to compete with an image presented on display substrate 46. To alleviate such image competition, substrate 46 can be positioned such that reflective surface 49 reflects an image of the headliner 40 toward the driver. Because vehicle headliners are of generally consistent, non-reflective material, such an image may compete less with the video image of display substrate 46.

Figure 6:
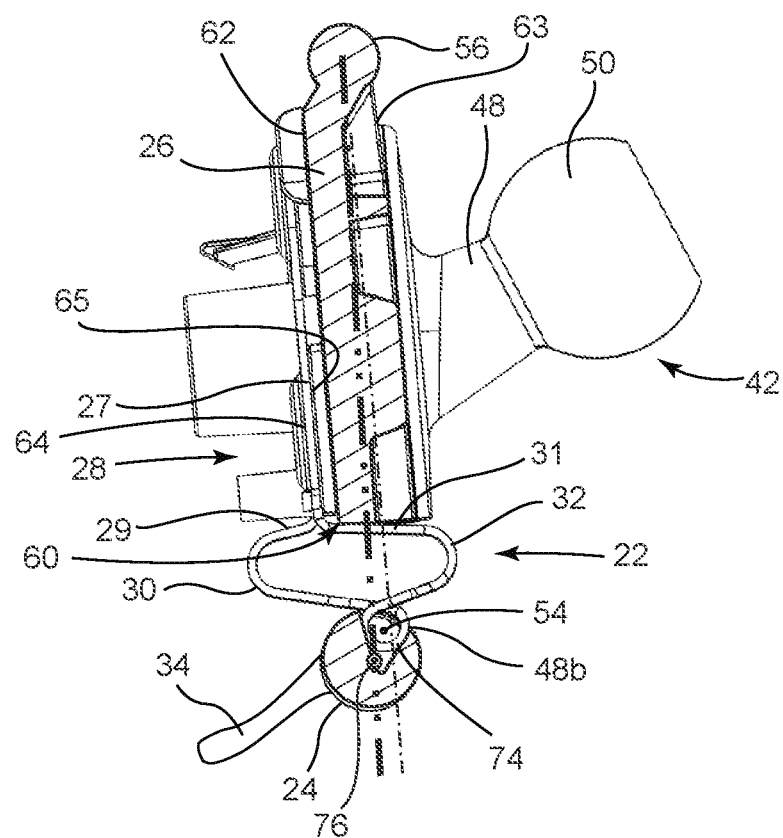
FIGS. 6 and 7 are side views of a mounting structure included in the rearview mirror assembly of FIG. respectively in the positions of FIGS. 2 and 1.
Figure 7:
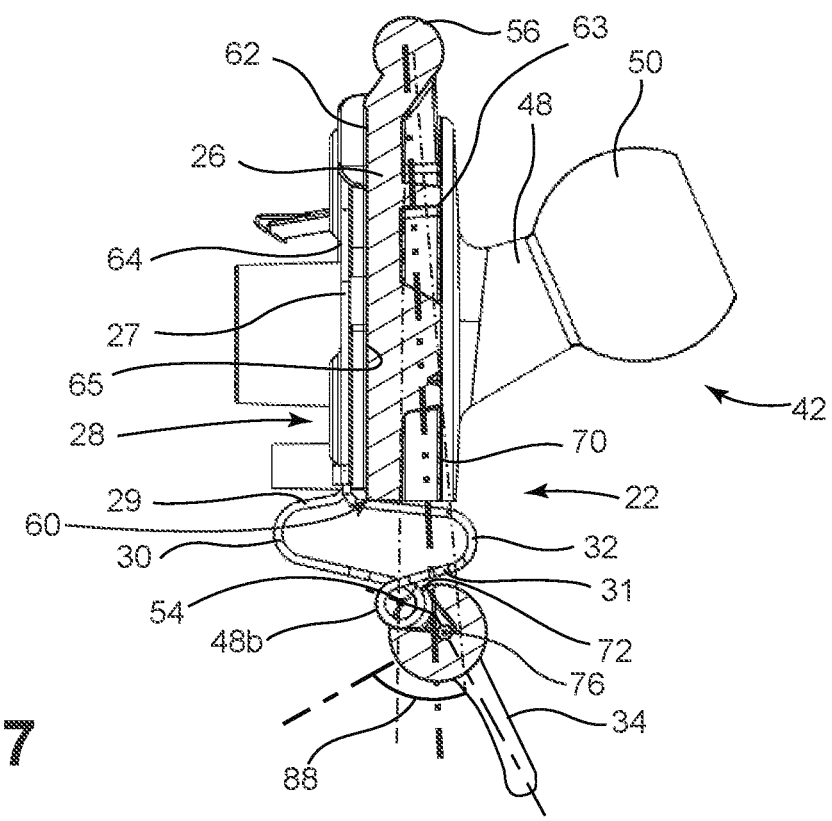
Figure 8:
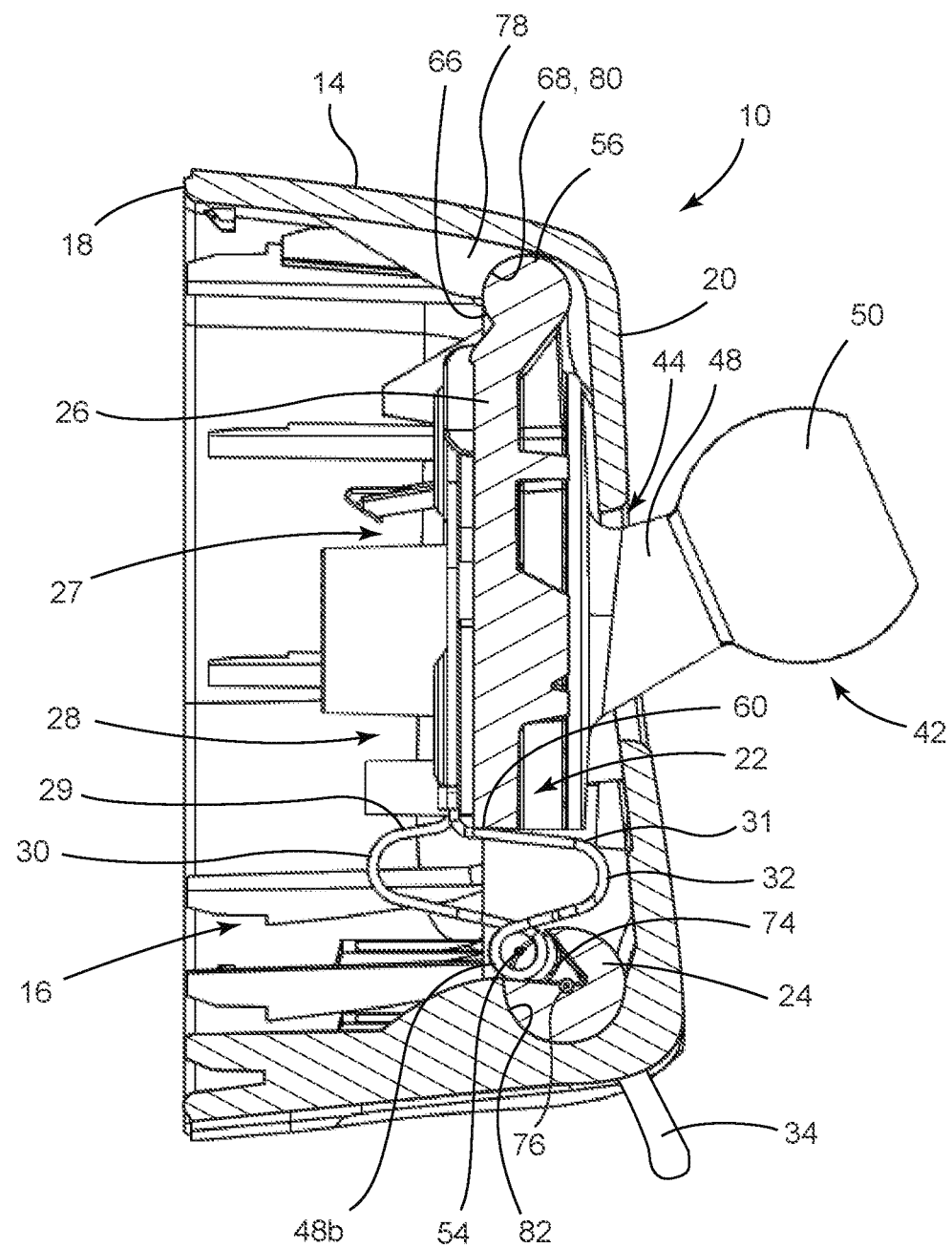
FIG. 8 is a cross-section view of the rearview mirror assembly of FIG. 1 taken along a vertical midplane therethrough.

Rearview mirror 10, by way of the actuation mechanism 22, spring plate 28, and toggle barrel 24 can provide for a user to control repositioning of display substrate 46 between an appropriate position thereof for use of reflective surface 49 when display substrate 46 is in the inactive state and for viewing of a displayed image, without undesirable competition, when display substrate 46 is in the active state. As described further, below, such movement can be achieved by manipulation of lever 34 (FIG. 6) between the first position, shown in FIG. 1, to the second position, shown in FIG. 2, which can cause actuation mechanism 22 to change from a first stable configuration (as shown in FIG. 7) to a second stable configuration (as shown in FIG. 8), which in turn causes movement of housing 14 and substrate 46 through a predetermined angle relative to mounting arm 42. In an example, such movement can be through a downward (i.e. away from headliner 40) angle of between about 5° and 10°, and in one embodiment about 6°.

As shown in the cross-section view of FIG. 8, mounting arm 42 can couple with actuation mechanism 22 by attachment with a mounting plate 26 thereof by a ball and socket arrangement 50. This arrangement can allow for the above-mentioned general adjustment of substrate 46 so as to position substrate 46 at a desired position with respect to the driver for viewing of the image presented on display substrate 46. As described further below, movement of lever 34 from the first position to the second position, for example, can cause movement of housing 14 relative to mounting plate 26, while mounting plate 26 remains generally static. Such a configuration can allow substrate 46 to toggle between the positions for substrate 46 provided by the above-referenced stable conditions of actuation mechanism 22 without changing the positions themselves.

In another embodiment, rearview mirror 10 may be a standard mirror, in which substrate 46 is a prism-type mirror substrate 46, which provides for a viewing angle at which substrate 46 reflects the rearview of mirror 10 with a reduced luminosity to provide a dimming effect useful when driving at night, for example. In such an embodiment, the dimmed viewing angle for substrate 46 may be at a predetermined angle upward (i.e. toward headliner 40) relative to the "normal" viewing angle. As such lever 34 may allow a user to adjust the substrate 46 from the standard viewing mode to the upward, dimmed mode, by movement thereof to change the state of the actuation mechanism 22, without changing the position of substrate 46 in the standard mode and, further, providing for movement into the dimmed mode such that substrate 46 provides generally the same view in the dimmed mode as has been selected for the standard mode.

In either embodiment, the mechanism by which lever 34 repositions substrate 46 may be generally similar in function to known rearview mirror toggle mechanisms. In general, such mechanisms operate by coupling the mirror's mounting plate, which may be similar to mounting plate 26 described herein with a toggle barrel, which may be similar to toggle barrel 24 described herein, by way of a resiliently deformable spring plate. In general, such spring plates include a bent section defined between an end of the mounting plate and the toggle barrel to provide an area of flexation therein that accommodates rotational movement of the toggle barrel including movement of the point of coupling between the toggle barrel and the spring plate in a vertical direction. In this manner, when the toggle barrel is rotated, it causes compression of the bent portion of the spring plate, while moving the lower end of the spring plate horizontally. This horizontal movement causes rotation of the mounting plate and, accordingly, the mirror substrate itself either upward or downward, depending on the direction of the toggle barrel rotation. The spring biasing force caused within the spring plate by vertical movement of the coupling point causes the spring plate to exert a torque on the toggle barrel toward whichever side of an apex of the toggle barrel that the coupling point is on. In this manner, and as applicable, the arm portions 29,31, in turn apply a movement to the mounting plate 26 holding it firmly against a corresponding portion of the housing 14 and thus in the corresponding stable position. The moment on the toggle barrel 24 opposes this force and in turn provides haptic feedback to the operator regarding the state of the actuation mechanism 22. By configuring the actuation mechanism 22 with opposite endpoints to the rotation of toggle barrel 24 (such as surfaces of the housing 14 at opposite ends of rotation of the lever 34 coupled with the toggle barrel 24), the spring force of the spring plate 28 can urge rotation of the toggle barrel 24 to one of the endpoints of rotation thereof, i.e. opposite stable positions.

Existing toggle mechanisms of this type typically include either a single bent section extending between the portion of the spring plate coupled with the mounting plate and the toggle barrel or include two arms with respective bent sections, such arms being identical or mirror images of each other. It has been discovered, however, that these types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. This position can be either a forward or rearward position of the toggle barrel-spring plate coupling, depending on the direction in which the bent portion extends. In general, however, the position in which the spring plate provides such a locking force will be a position of the coupling between the toggle barrel and the spring plate that is opposite the position of the bent portion. This is due to the fact that, when the coupling point is adjacent the bent portion, the initial movement of the coupling is vertical movement that is directly compressive on the bent portion. However, in the opposite position, wherein the coupling point is opposite the bent portion, the initial movement of the coupling also includes a lateral component that causes slight binding of the mechanism that provides a degree of mechanical locking by requiring an additional force to overcome the binding action. Such mechanisms may, thusly provide reliable mechanical locking in such a position, but may be susceptible, depending on the particular spring force and other internal forces (such as in an adjustment mechanism for the mounting plate on an associated arm, base, or the like), to inadvertent movement out of the stable position.

Such inadvertent actuation may be caused by a user adjusting the position of substrate 46 by grasping and moving housing 14, intending to move housing 14 relative to mounting arm 42 by movement of mounting plate 26 relative thereto. During such movement, particular forces can urge housing 14 toward the second stable position with respect to mounting plate 26, which may cause such inadvertent actuation of actuation mechanism 22 and corresponding movement of housing 14 and, accordingly, substrate 46 into second position. In the case of a standard prism mirror, such inadvertent actuation may be inconvenient. Further, in the case of a display mirror, as described above, movement out of the first position may trigger deactivation of display substrate 46, meaning that the desired view from rearview mirror 10 may change.

Figure 4:
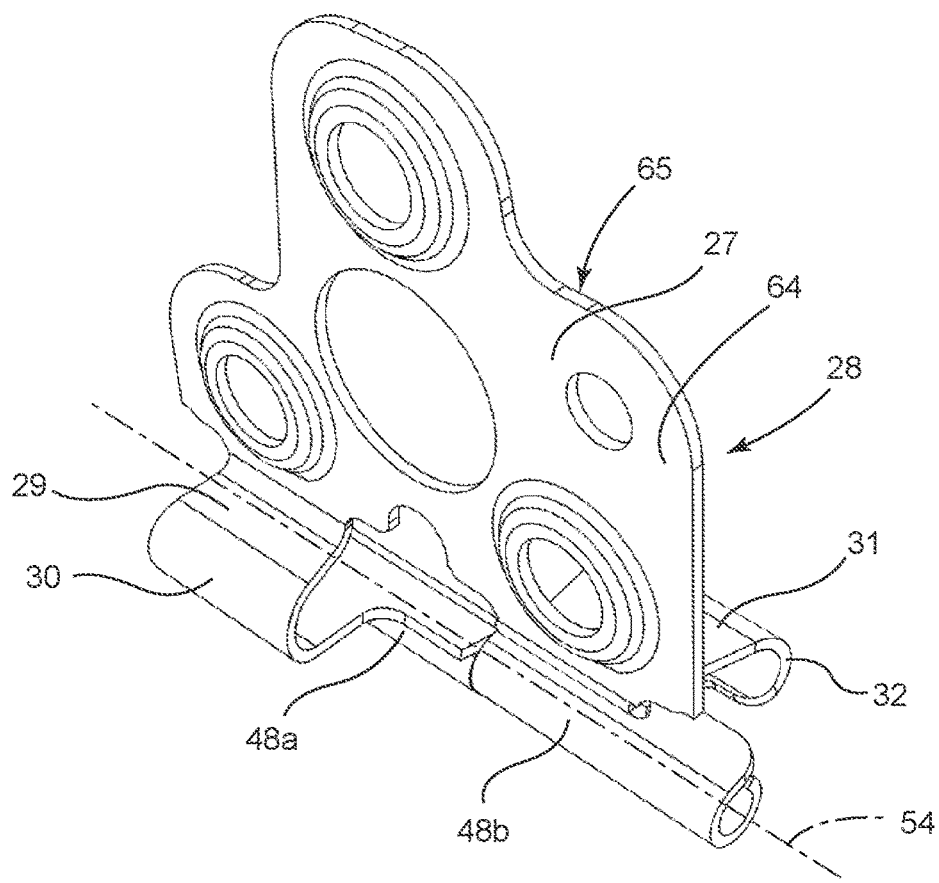
FIGS. 4 and 5 are front and rear perspective views of a spring plate included in the rearview mirror assembly of FIG. 1.
Figure 5:
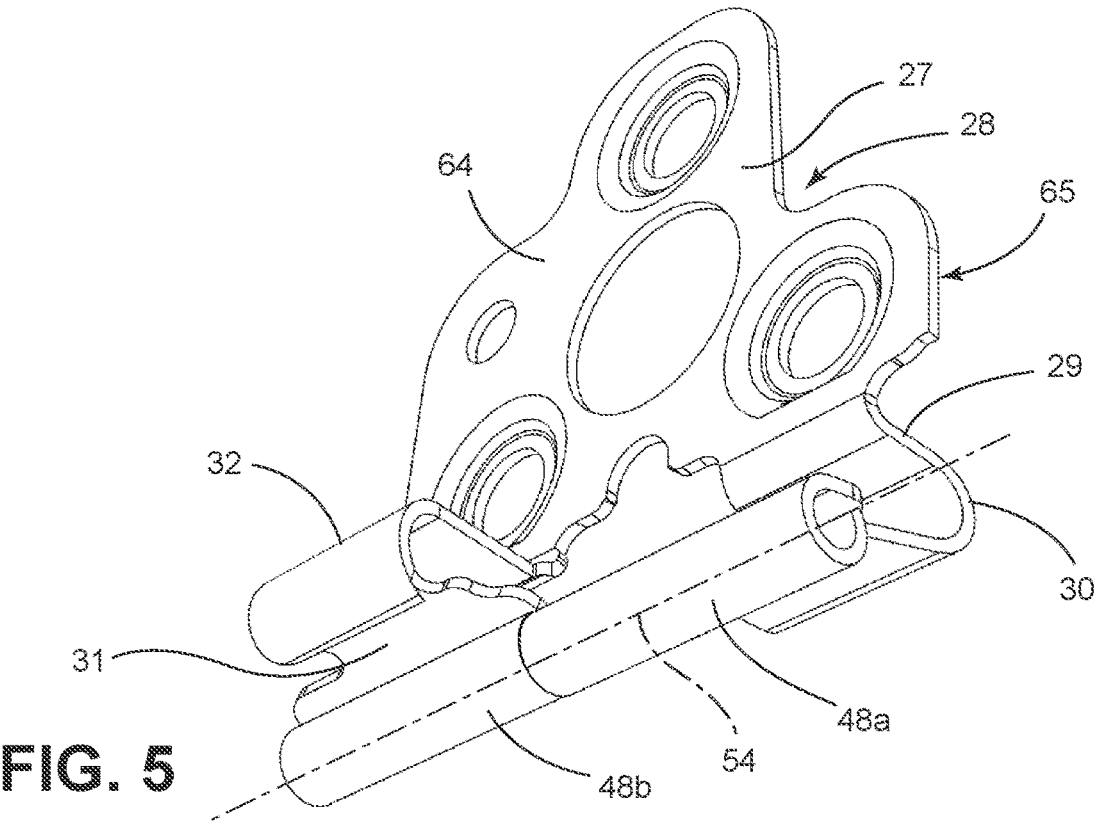

Accordingly, the present actuation mechanism 22 includes a spring plate 28, as shown in FIGS. 4 and 5 that includes the above-mentioned pair of arm portions 29 and 31 with corresponding bends 30 and 32 therein that are positioned on opposite sides of the spring plate 28. In particular, arm 29 extends from the body 27 of spring plate 28 on a side thereof that is disposed toward the rearward portion of housing 14 (i.e. the portion over which substrate 46 is positioned and which faces the driver of vehicle 12). Accordingly, as shown in FIGS. 6 and 8, bend 30 is positioned rearward of body 27 such that arm 29 further extends from bend 30 in a horizontal direction back toward body 27 to a generally cylindrical end 48a that serves as a point of coupling between arm 29 and toggle barrel 24. Conversely, arm portion 31 extends initially away from body 27 in a direction toward the front of housing 14, oppositely of arm 29, to a bend 32 positioned forward of body 27. Arm 31 then extends rearward from bend 32 to an end 48b thereof adjacent the end 48a of arm 29 such that arm 31 couples with toggle barrel 24 along a coupling axis 54 defined thereby. It is noted that aspects of the shape and construction of spring plate 28 can vary according to the particular configuration of the rearview mirror 10 and other components of the actuation mechanism 22. In particular, the shape of body 27 can vary to appropriately couple with the associated mounting plate 26. In a further embodiment, a variation of spring plate 28 may include three arm portions, in a symmetrical arrangement with, for example a center, forward directed-arm and left and right rearward-directed arms. In such an example, the center arm may be wider than the left and right arms to provide balanced forces in both stable positions without applying a moment in a horizontal plane due to uneven forces.

The movement of housing 14 relative to mounting arm 42 is facilitated by the rotation of toggle barrel 24 and corresponding movement of spring plate 28 causing the desired rotation of mounting plate 26 about first end 56 thereof. As shown in FIGS. 5-8, mounting plate 26 can couple a portion of mounting structure 58 (FIG. 3) within housing 14. As discussed above, housing 14 defines an aperture 44 (FIG. 8) positioned adjacent mounting plate 26 such that mounting arm 42 can pass therethrough, thus allowing mounting plate 26 to couple with mounting arm 42 to retain rearview mirror 10 in an adjustable position with respect to windshield 38 or headliner 40. Accordingly, the above-described relative movement of housing 14 with respect to mounting plate 26 causes movement of housing 14 (and accordingly substrate 46 coupled therewith) in the form of rotation thereof about first end 56 of mounting plate 26. Such movement, in turn, moves substrate 46 between the above-described upward (FIG. 2) and downward (FIG. 1) positions. As illustrated in FIGS. 6 and 7, such orientation can be achieved by rotation of mounting plate 26 with respect to housing 14 through an angle of between about 5° and about 10°, and in one embodiment about 6°, although such an angle can vary based on the location and structure of rearview mirror 10.

As described above, movement of housing 14 and substrate 46 can be achieved by the above-described operative coupling of toggle barrel 24 with arm portions 29 and 31. In this arrangement, rotation of toggle barrel 24, such as by manipulation of lever 34, causes rotation of housing 14, within which toggle barrel 24 is rotatably mounted. This rotation results in corresponding rotation of substrate 46 about first end 56 of mounting plate 26 and upward or downward with respect to mounting structure 58 with which mounting plate 26 is adjustably fixed, as discussed further below.

Returning to FIGS. 1 and 2, housing 14 is shown in the form of a single-piece structure, and can further be made from a single piece of injection molded plastic or the like, although other materials are possible. Substrate 46 (FIG. 3) can be coupled with a bezel, or other secondary housing piece, that can, in turn, be coupled with housing 14 to fix substrate 46 over an open side 18 of housing 14. In another example, substrate 46 can be coupled directly to housing 14 over open side 18. In either example, housing 14 is structured so that interior cavity 16 is of a sufficient depth to retain internal structures thereof, including actuation mechanism 22, and other related structures.

Mounting plate 26, as described above, is rotatably coupled with housing 14 at first end 56 thereof. Such coupling can be achieved by any of various mounting structures therein, which, in one example, can include the incorporation of a first hinge portion 66 into first end 56 of mounting plate 26 and by including a mating second hinge portion 68 within housing 14. As depicted in FIG. 8, for example, housing 14 can include a pair of internal support ribs 78 therein, which can be spaced to receive mounting plate 26 in a space defined between the support ribs 78. Each of the support ribs 78 can include a first channel 80 therein that defines the above-referenced second hinge portion 68 and is shaped to receive first hinge portion 66 therein. Alternatively, a separate hinge (not shown) can be coupled between mounting plate 26 and housing 14. As also shown in FIGS. 1 and 2, mounting plate 26 can generally extend through a majority of a vertical height of housing 14.

Returning to FIGS. 6 and 7, it may be desirable to structure toggle barrel 24, spring plate 28 (including arm portions 29 and 31), and mounting plate 26 such that, as discussed above, the operable coupling of arm portions 29 and 31 with toggle barrel 24 provides two stable positions for toggle barrel 24 that correspond to the first (FIG. 1) and second (FIG. 2) positions for housing 14, which are angularly spaced-apart from each other by angle 70 which may be between about 5° and about 10° (and in an embodiment about 6°). Further, such rotation of housing 14 about mounting plate 26 can be achieved through rotation of toggle barrel 24 through an angle of between about 70° and 100° and in one embodiment about 80°, for example.

As discussed previously, the coupling of arm portions 29 and 31 with toggle barrel 24 can at least partially dictate both for the desired rotation of housing 14 and for the above-noted stable positions and positional locking. In particular, arm portions 29 and 31 are coupled with toggle barrel 24 by engagement of the ends 48a, 48b thereof within slot 74, which is configured so as to receive arm portion 29 (such as by a cradling, snap, or press-fit arrangement) and to maintain a general position thereof such that the coupling axis 54 is offset from an axis 76, about which toggle barrel 24 rotates. Referring again to FIG. 8, ribs 78 can include a second channel 82 positioned parallel to and at a fixed distance from first channel 80 and sized to receive toggle barrel 24 therein. In particular, both toggle barrel 24 and second channel 82 can be generally cylindrical (at least in the area of coupling therebetween) such that, when toggle barrel 24 is received in second channel 82, toggle barrel 24 is rotatable about axis 76 that corresponds with the centers of the circular cross-sections defined by both toggle barrel 24 and second channel 82.

The offset arrangement of slot 74 with respect to axis 76 is such that slot 74 translates in the longitudinal horizontal direction upon rotation of toggle barrel 24 about axis 76. This translation causes movement of arm portions 29 and 31, which are coupled therewith, resulting in rotation of mounting plate 26 about first end 56. Arm portions 29 and 31 are of a resiliently deformable material, such as metal (e.g. spring steel, aluminum, or the like), for example, which may be the same as the entirety of spring plate 28 with which arm portions 29 and 31 may be integrally joined. The resilient deformability of arm portions 29 and 31 allows them to accommodate the component movement of slot 74 in the vertical direction during the rotation thereof that results in the aforementioned longitudinal horizontal translation. Arm portions 29 and 31 can further be tuned to provide the above-noted stable positions for actuation mechanism 22 and, accordingly, rearview mirror 10.

In particular, the resilient deformability of arm portions 29 and 31, particularly at the locations of the respective bends 30 and 32 may be such that arm portions 29 and 31 exert respective spring forces biased against the compression thereof, which results from the vertical movement component of slot 74 during rotation of toggle barrel 24 about axis 76. As discussed above, the forward extension of arm portion 29 from bend 30 to end 48a thereof can produce an additional binding force that resists inadvertent movement out of the downward position of FIG. 7 by, for example, the user exerting a force on housing 14 to adjust mirror 10 about ball 50 of mounting structure 58. As discussed above, such binding action is not achieved by arm portion 29 in the upward position illustrated in FIG. 6. Accordingly, arm portion 31 is positioned with a forward extension thereof from bend 32 to end 48b such that a binding force in addition to the upward compressive force thereof is provided to help prevent inadvertent movement of rearview mirror 10 out of the upward position.

The combined compressive forces of arm portions 29 and 31 are, together, sufficient to overcome the internal forces of actuation mechanism 22 (e.g. friction between and among the various components thereof) and to urge toggle barrel 24 into either of the positions thereof that are associated with the first position (as shown in FIGS. 1 and 7) and the second position (as shown in FIGS. 2 and 6), upon slot 74 passing a vertical-most position (in which coupling axis 54 is at distance from first end 56 of mounting plate 26 shorter than when actuation mechanism 26 is in either stable position) during rotation thereof. In other words, arm portions 29 and 31 together can provide a generally vertically-downward force on slot 74 that urges rotation of toggle barrel 24, when slot 74 is on either side of the vertical-most position during rotation thereof, to the nearest one of the first and second stable positions. Arm portions 29 and 31 can be tuned (such as by material selection, thickness, and geometry) such that the combined compressive forces of arm portions 29 and 31 as well as the respective binding forces of arm portions 29 and 31 in the associated stable positions can be equal or substantially equal (i.e. within about 10% in an embodiment or within about 5% in a further embodiment) between the upward and downward positions of rearview mirror 10. Arm portions 29 and 31 can, further, be configured so as to be under compression when actuation mechanism 22 is in either stable position.

As illustrated in FIGS. 6 and 7, the movement of housing 14 between the first (FIG. 1) and second (FIG. 2) positions by actuation mechanism 22 is achieved by movement of lever 34 from corresponding first and second positions. As shown, lever 34 is coupled with (and can, further be integrally-formed with) toggle barrel 24 such that the movement of lever 34 from the first position (FIG. 1) to the second position (FIG. 2) through an angle 88 of rotation thereof causes corresponding movement of toggle barrel 24 and, therefore, the above-described movement of housing 14. Alternatively, the actuation mechanism 22 described herein can be used to provide for stable positions and to prevent inadvertent movement out of such stable position in a full-display mirror having motorized movement and, accordingly, lacking a lever. Variations of such a mechanism are described in co-pending, commonly assigned U.S. patent application Ser. Nos. 15/053,252 and 15/053,290, now U.S. Pat. Nos. 9,963,074 and 9,718,409, respectively, the entire disclosures of which are hereby incorporated by reference herein.

It will be understood that exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An actuation mechanism for a rearview mirror, comprising:
   a mounting plate defining a first end and a second end with opposite first and second faces extending between the first and second ends;
   a spring plate coupled with the first face of the mounting plate with a first side of the spring plate disposed toward the first face of the mounting plate and a second side facing opposite the first side and away from the first face, the spring plate having a first resiliently deformable arm portion extending away from the second end of the mounting plate in a first direction to define a first bend disposed on the first side of the spring plate and a second resiliently deformable arm portion extending away from the second end of the mounting plate in a second direction opposite the first direction to define a second bend disposed on the second side of the spring plate; and
   a toggle barrel, the first and second arm portions of the spring plate being operably coupled with the toggle barrel along a coupling axis.

2. The actuation mechanism of claim 1, further including a mounting structure, the mounting structure defining a first channel therein rotatably receiving the first end of the mounting plate therein such that the mounting plate is rotatable with respect to the mounting assembly about the first end.

3. The actuation mechanism of claim 2, wherein the mounting structure further defines a second channel spaced from and parallel to the first channel, the toggle barrel being rotatably received within the second channel.

4. The actuation mechanism of claim 1, wherein:
   the mounting plate is rotatable about a first axis extending through the first end thereof;
   the toggle barrel is rotatable about a second axis extending therethrough with the coupling axis offset therefrom; and
   the first axis and the second axis are parallel to and disposed at a fixed distance from each other.

5. The actuation mechanism of claim 4, wherein rotation of the toggle barrel through a first angle causes rotation of the mounting plate about the first end between first and second stable positions at least partially dictated by the first and second arms of the spring plate.

6. The actuation mechanism of claim 5, wherein:
   the first and second arm portions provide respective forces against the toggle barrel and into the first and second stable positions; and a combined force of the respective forces of the first and second arm portions is substantially the same in the first stable position as in the second stable position.

7. The actuation mechanism of claim 5, wherein:
the first arm portion provides a first binding force against the toggle barrel in the first stable position; and
the second arm portion provides a second binding force against the toggle barrel in the second stable position.

8. The actuation mechanism of claim 5, wherein:
the first angle is between about 70 degrees and 100 degrees; and
the stable positions are rotationally spaced about the first end of the mounting plate at an angle of between about 5 degrees and 10 degrees.

9. The actuation mechanism of claim 5, wherein:
the rotation of the toggle barrel through the first angle moves the coupling axis from a first position at a first distance from the first end of the mounting plate to a second position at a second distance from the first end of the mounting plate and through an apex position at a third distance from the first end of the mounting plate that is less than the first and second distances; and
the arm portions are biased against the toggle barrel to urge the coupling axis away from the apex position and toward a nearest of the first and second positions, the first and second positions corresponding to the first and second stable positions such that an opposing force is applied on the mounting plate to retain the mounting plate in the corresponding one of the first and second positions.

10. A rearview mirror for a vehicle, comprising:
a housing defining an interior cavity and an open side;
a substrate coupled within the open side of the housing and having a reflective surface thereon; and
an actuation mechanism coupled within the housing and including:
a mounting plate having a first end rotatably coupled within the cavity of the housing and a second end spaced from the first end, the mounting plate defining first and second opposed faces extending between the first and second ends;
a spring plate coupled with the mounting plate with a first side thereof disposed toward the first face of the mounting plate and a second side facing opposite the first side and away from the first face, the spring plate having a first resiliently deformable arm portion extending away from the mounting plate in a first direction to define a first bend disposed on the first side of the spring plate and a second resiliently deformable arm portion extending away from the mounting plate in a second direction opposite the first direction to define a second bend disposed on the second side of the spring plate; and
a toggle barrel rotatably coupled within the interior cavity of the housing, the first and second arm portions of the spring plate being operably coupled with the toggle barrel along a coupling axis.

11. The rearview mirror of claim 10, wherein rotation of the toggle barrel through a first angle causes rotation of the mounting plate about the first end between first and second stable positions at least partially dictated by the first and second arms of the spring plate.

12. The rearview mirror of claim 11, wherein:
the first and second arm portions provide respective forces against the toggle barrel and into the first and second stable positions; and
a combined force of the respective forces of the first and second arm portions is substantially the same in the first stable position as in the second stable position.

13. The rearview mirror of claim 11, wherein:
the first arm portion provides a first binding force against the toggle barrel in the first stable position; and
the second spring portion provides a second binding force against the toggle barrel in the second stable position.

14. The rearview mirror of claim 11, wherein:
the first angle is between about 70 degrees and 100 degrees; and
the stable positions are rotationally spaced about the first end of the mounting plate at an angle of between about 5 degrees and 10 degrees.

15. The rearview mirror of claim 11, wherein:
the rotation of the toggle barrel through the first angle moves the coupling axis from a first position at a first distance from the first end of the mounting plate to a second position at a second distance from the first end of the mounting plate and through an apex position at a third distance from the first end of the mounting plate that is less than the first and second distances; and
the arm portions are biased against the toggle barrel to urge the coupling axis away from the apex position and toward a nearest of the first and second positions, the first and second positions corresponding to the first and second stable positions such that an opposing force is applied on the mounting plate to retain the mounting plate in the corresponding one of the first and second positions.

16. The rearview mirror of claim 10, wherein the actuation mechanism further includes a lever extending from the toggle barrel through the housing, the lever being rotatable with corresponding rotation of the toggle barrel with respect to the housing between a first position and a second position.

17. The rearview mirror of claim 16, wherein rotation of the toggle barrel between the first position and the second position causes rotation of the mounting plate about the first end between first and second stable positions at least partially dictated by the first and second arm portions of the spring plate.

18. A vehicle comprising:
a windshield;
a headliner adjacent an upper edge of the windshield; and
a rearview mirror, including
a housing defining an interior cavity and an open side;
a substrate coupled within the open side of the housing and having a reflective surface thereon; and
an actuation mechanism coupled within the housing and including:
a mounting arm coupled with one of the windshield or the headliner;
a mounting plate coupled with the mounting arm and having a first end rotatably coupled within the cavity of the housing and a second end spaced from the first end, the mounting plate defining first and second opposed faces extending between the first and second ends;
a spring plate coupled with the mounting plate with a first side thereof disposed toward the first face of the mounting plate and a second side facing opposite the first side and away from the first face, the spring plate having a first resiliently deformable arm portion extending away from the mounting plate in a first direction to define a first bend disposed on the first side of the spring plate and a second resiliently deformable arm portion extending away from the mounting plate in a second direction opposite the first direction to define a second bend disposed on the second side of the spring plate; and a toggle barrel rotatably coupled within the interior cavity of the housing, the first and second arm portions of the spring plate being operably coupled with the toggle barrel along a coupling axis.

19. The vehicle of claim 18, wherein rotation of the toggle barrel through a first angle causes rotation of the mounting plate about the first end between first and second stable positions, wherein when in the first stable position, the substrate is angled toward the headliner by between 5 degrees and 10 degrees relative to the second stable position.

20. The vehicle of claim 18, wherein:
the first and second arm portions provide respective forces against the toggle barrel and into the first and second stable positions, a combined force of the respective forces of the first and second spring arms being substantially the same in the first stable position as in the second stable position;
the first arm portion provides a first binding force against the toggle barrel in the first stable position; and
the second arm portion provides a second binding force against the toggle barrel in the second stable position.

* * * * *